No. 781,424. PATENTED JAN. 31, 1905.
K. D. HEQUEMBOURG.
HOT WATER HEATER FOR RAILWAY CARS.
APPLICATION FILED DEC. 28, 1903.
2 SHEETS—SHEET 1.
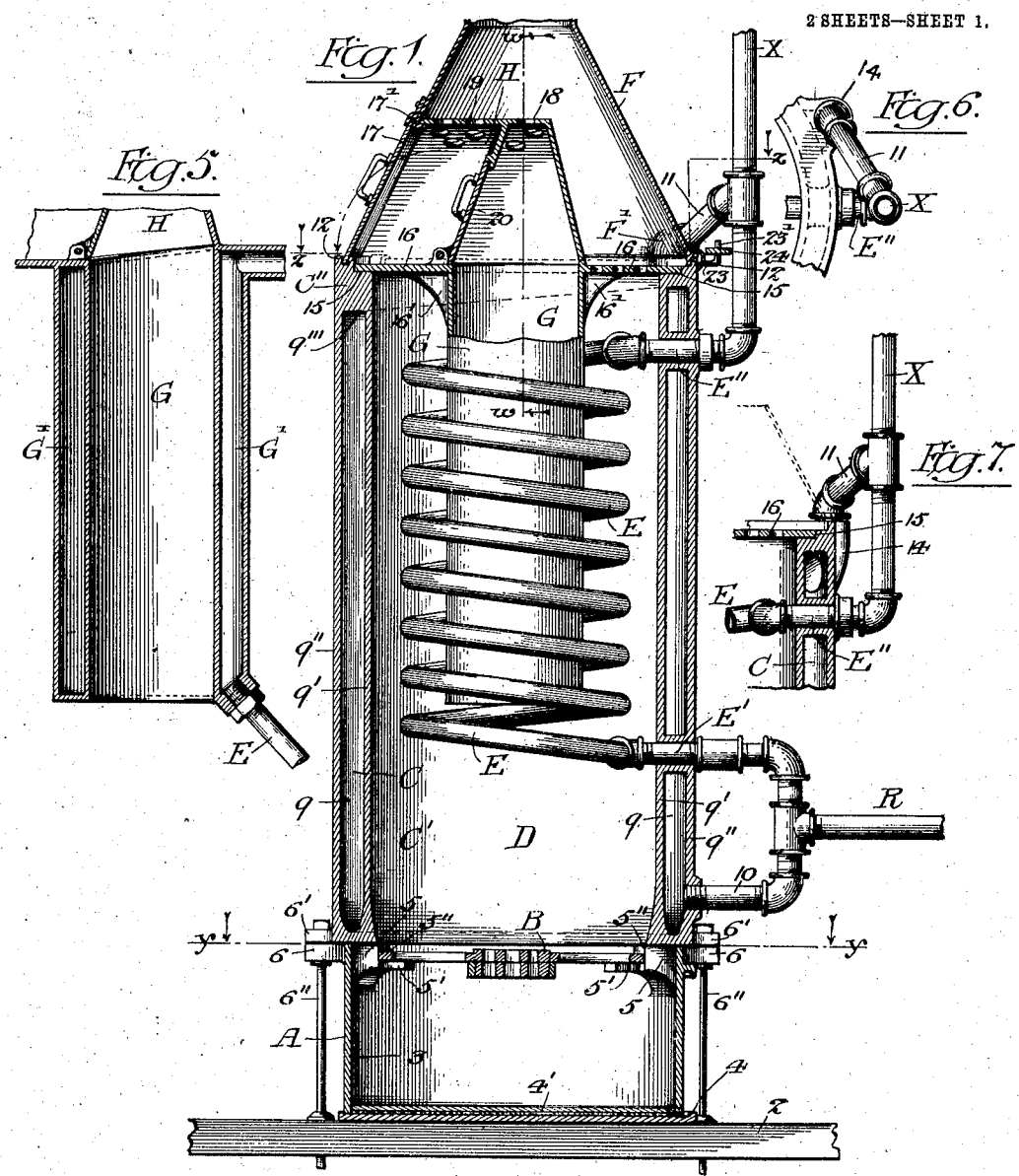
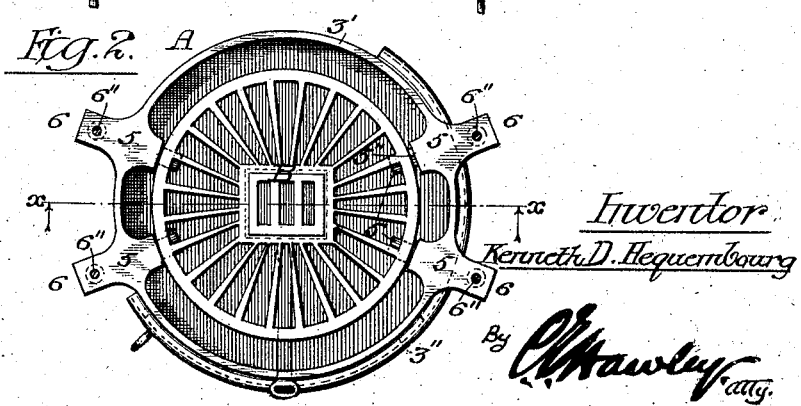
Witnesses:—
Louis M. Whitehead
B. K. Lifton
Inventor
Kenneth D. Hequembourg
By C. Hawley
atty.

No. 781,424. PATENTED JAN. 31, 1905.
K. D. HEQUEMBOURG.
HOT WATER HEATER FOR RAILWAY CARS.
APPLICATION FILED DEC. 28, 1903.
2 SHEETS—SHEET 2.
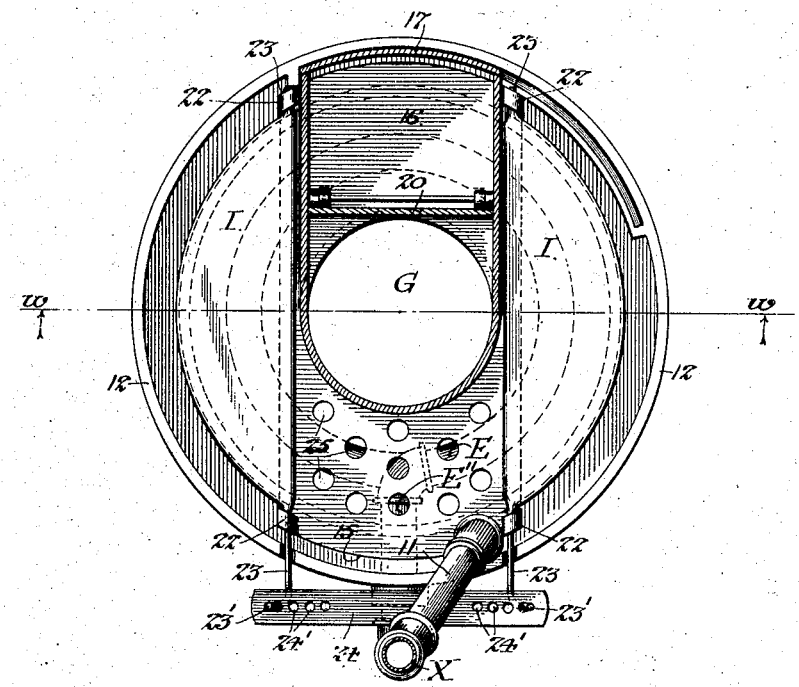
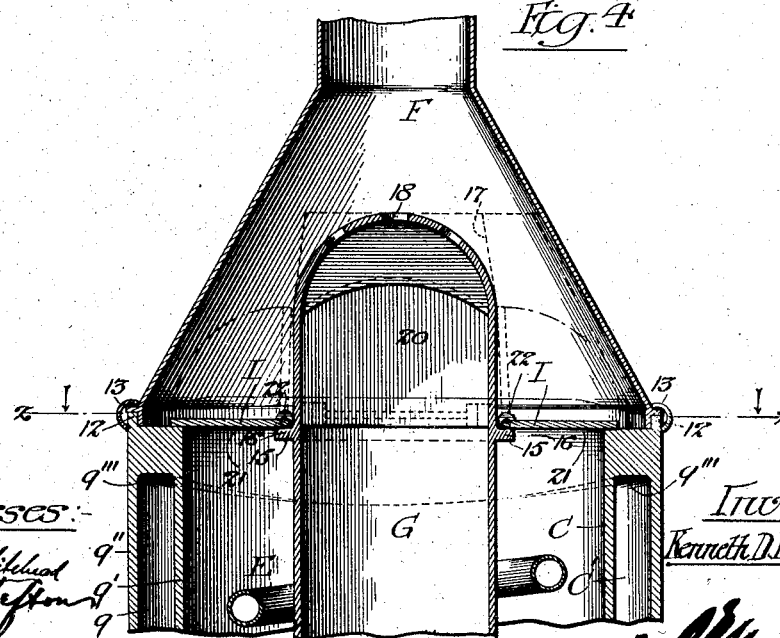

No. 781,424. Patented January 31, 1905

UNITED STATES PATENT OFFICE.

KENNETH D. HEQUEMBOURG, OF CHICAGO, ILLINOIS.

HOT-WATER HEATER FOR RAILWAY-CARS.

SPECIFICATION forming part of Letters Patent No. 781,424, dated January 31, 1905.

Application filed December 28, 1903. Serial No. 186,906.

*To all whom it may concern:*

Be it known that I, KENNETH D. HEQUEMBOURG, a citizen of the United States, residing at the city of Chicago, in the county of Cook and State of Illinois, have invented a certain new, useful, and Improved Hot-Water Heater for Railway-Cars, of which the following is a specification.

My invention relates to heating means for use in heating railway-cars by circulating hot water through suitable radiators therein; and my invention has particular reference to hot-water heaters of the class used in street and suburban cars.
The object of my invention is to improve the construction and operation of such heaters and make them more efficient and durable.

A particular object of my invention is to provide a heater which in proportion to its size shall be of greater heating capacity than those in present use.

Another object which I have in view is to provide a heater which shall utilize within itself substantially all of the heat therein generated and which shall not itself directly radiate any considerable amount of heat.

Still another object of the invention is to provide a hot-water heater of simple construction wherein the water circulation shall be divided to utilize not only the heat that rises from the fire within the heater, but that also which commonly penetrates the walls of the heater and is radiated from the exterior thereof.
A further object of my invention is to provide a hot-water heater of the general size and type commonly used in cars and which shall have a fuel-magazine and fuel-head suspended within the body of the heater and capable of being readily placed therein or removed therefrom and, further, which shall be particularly adapted to prevent the escape of the gases into the outer air save through the smoke stack or pipe.
Another object of my invention is to provide a heater that shall have simple and durable dampers or regulating-valves that shall be contained within the heater itself and which may be easily operated to control the combustion of the fuel.

Other objects of my invention will be made apparent hereinafter.

My invention consists generally in a hot-water heater for railway-cars, comprising the constructions and combinations of parts hereinafter described, and particularly pointed out in the claims.

My invention will be more readily understood by reference to the accompanying drawings, forming a part of this specification, and in which—

Figure 1 is a vertical section of a car-heater embodying my invention on the line $x\ x$ of Fig. 2. Fig. 2 is a plan view of the base of the heater as seen from the line $y\ y$ of Fig. 1.
Fig. 3 is an enlarged horizontal section substantially on the line $z\ z$ of Fig. 1 or Fig. 4, showing the fuel-head and the draft-regulating dampers. Fig. 4 is an enlarged vertical transverse section in the plane of the lines $w$ $w$ of Figs. 1 and 3, viewed in the direction of the arrow. Fig. 5 illustrates a modified form of the fuel-magazine to be employed in conjunction with the internal coil or in place thereof, according to the heating-surface that may be required in different cars. Fig. 6 is a plan view illustrating a modified form of connection between the water-jacket of the heater-body and the outlet-pipe, and Fig. 7 is a vertical section further illustrating said modification.

The shape or design of my heater may be varied at will, and its circumference and height will depend upon the service to be performed. The heater is preferably cylindrical, and its height is usually small in order that the fuel-door may be at a convenient height from the floor. Any of the modifications of size, shape, and arrangement that would readily suggest themselves to those skilled in the art may be made in my heater without departing from the spirit of my invention. This being understood, I will describe same as it appears when embodied in the form which I prefer.

The body C rests upon the base A, which is composed of the deep ring 3 and the floor-plate 4, the latter being preferably provided with an asbestos lining 4'. The ring 3 presents a narrow edge 3' to the wide annular bottom of the body C, making a tight joint therewith.

If desired, both parts may be finished or either thereof may be provided with a groove to receive suitable packing when it is desired to make a perfectly tight joint. The ring 3 contains an opening in its side that is closed by a door 3", that may be opened to place or remove an ash-pan that is usually provided with the heater. Near its upper edge the ring 3 has the internal lugs 5 and the external lugs 6. The latter correspond to lugs 6' at the lower end of the body C, and the body is rigidly secured upon the base by bolts 6", that pass through the lugs 6 6' and into the floor 2. The internal lugs 5 have smaller extensions 5', upon which the grate B rests. The grate is held between the inner ends or shoulders 5" of the lugs 5, and as the opening in the bottom of the body C is of greater size than the grate B said grate may be easily placed upon the lugs or removed from them by tilting the grate upward and passing it either up or down between the lugs 5'. The grate may in this manner be placed by inserting it through the door in the base, and it is never necessary to dismember the heater in order to repair the grate. On the other hand, the body may be easily removed from the base when the bolts are taken out of the lugs. It will be observed that the interior of the body is preferably tapered, so that the chamber therein is smallest at the bottom, and the inner edge of the bottom overhangs the interior of the base-ring, lying close about the circumference of the grate. This construction enables me to dispense with the usual grate-ring. The inner surface C' of the body may be either plain or corrugated. The burning fuel when the heater is in use lies directly against the inner surface C', and the usual fire-box is rendered unnecessary, because of the presence of a body of water within the walls of the body C, which prevents the overheating, warping, or burning of the inner wall. The body of water here spoken of is contained in the water space or jacket 9, provided between the inner and outer walls 9' and 9" of the body. The space 9 extends nearly to the bottom of the body and is carried upward to the top thereof. The water is admitted to the lower part of the space or jacket 9 through the hot-water return-pipe 10 and leaves the jacket through the exit-pipe 11 at the top of the body. The pipes 10 and 11 may be connected through the usual radiating system, and the water circulates continuously in the water-jacket 9, the rate of circulation depending upon the temperature that is imparted to the inner wall 9' of the body C. To facilitate the circulation of the water in the jacket and to prevent the stagnation of the water in the upper forward part of the jacket, I preferably incline the upper end or top 9''' of the jacket 9, as shown in Figs. 1 and 4. The inclination is such that the water will flow readily toward the exit-pipe 11. Another advantage attaches to this construction—namely, the forward upper edge C'' of the body is thickened, so that it will readily withstand all blows to which it may be subjected, same underlying the fuel-door.

The dome or hood F of the heater may be a metal casting, and its lower edge is preferably flanged to fit a top flange 12 on the body C. The joint may be concealed by a molding 13. The rear side of the hood F is preferably provided with an indentation F', or an opening may be cut therein to make room for the pipe 11 where it is connected to the top of the water-jacket. In lieu of this construction I may provide the body C with an offset outgoing water connection 14, as shown in Figs. 6 and 7. The offset 14 enables me to use a sheet-metal hood F, as the connection between the body C and pipe 11 is thus carried beyond the edge of the body and does not interfere with the hood.

The annular top of the body is provided with recesses 15, diametrically opposite, to receive the cross-plate 16 of the magazine G. The ends of this plate drop into the notches 15 and are held thereby, preferably without additional means of securing the plate. The magazine G is preferably an integral part of the plate-casting, but the magazine may be a separate sheet-metal part or casting suitably attached to the cross-plate. Where the parts are integral I prefer to strengthen their joining by a small rib 16'. (See Fig. 1.) It will be noted that the magazine occupies a substantially central position in the heater-body, while the fuel-feed door 17 is arranged in the forward side of the hood or dome F. For connecting the magazine and door I employ the fuel-head H, which is preferably integral with the plate 16 and magazine G. This head extends from the magazine and joins the door-frame or flange 17' on the hood F. The top of the head H has a number of perforations 18 to permit the escape of gas from the portion of the head immediately above the magazine G, and the head is provided with other perforations 19, through which air may be admitted above the fire upon the opening of the fuel-door 17.

20 is an intermediate door or valve provided in the head H. This is preferably pivoted on the top of the plate 16 and when closed prevents the escape of gas from the magazine into the forward part of the head. Any gas which collects in the upper part of the magazine will therefore be directed through the openings 18 into the top of the hood or dome, where it will be drawn off through the smoke pipe or stack, all danger of leakage of gas from the stove or heater being thus avoided. When it is desired to fill the magazine with coal, the outer door 17 is first opened, after which the inner door or valve 20 may be opened by throwing it down upon the forward portion of plate 16. In this position the door 20 serves as the floor of the fuel-head, and the fuel may be easily passed in over it. The length or height of the door 20 is such that when it is opened its edge will extend beyond the door-opening, and the outer door, therefore, cannot be closed until the inner door has been swung shut. This construction insures the closing of the upper part of the magazine after the magazine has been filled.

The employment of a relatively narrow cross plate or bridge 16 leaves a segmental opening 21 on each side of it, in which the segmental dampers I are arranged. The plate 16 is preferably provided with pivot eyes or loops 22 to receive the pivot pintles or pins 23 of the dampers. The top of the plate 16 is in the same plane with the top surface or shoulder of the body-casting, and when the dampers are lowered they rest snugly on said top, effectually closing the openings. One of the pintles or pins on each damper is extended beyond the hood and is turned up to form a handle 23', and the dampers may be held in any desired position by means of the yoke 24, provided with a number of holes 24' to receive the upper ends of the damper-handles. As shown in Fig. 3, the rear part of the cross-plate is preferably provided with a number of perforations 25 for slightly venting the heater when the dampers are closed.

A particular advantage of the construction here described is that upon the removal of the hood F the magazine may be easily taken out of the heater with all of the parts—to wit, the fuel-head and the dampers—which are connected to the magazine.

The means for utilizing the heat that is generated within the body and which rises therein may be either a water-jacket G', surrounding the magazine, as shown in Fig. 5, or may be a coil E, as shown in Figs. 1, 3, and 4. If desired, both water-jacket and coil may be used, and in either case the inlet and outlet of such internal heating device will be connected to the return and exit pipes, with which pipes 10 and 11 communicate. When the jacketed magazine is used, I prefer that the outlet shall be integral with the rest of the casting and that the inlet pipe or pipes shall extend to the walls of the heater and support the magazine. If desired, the lower end of the magazine-jacket or of the coil E may communicate with the water-space 9; but I prefer to provide an independent connection with the return water-pipe upon the exterior of the heater.

Referring now to Fig. 1 of the drawings, it will be noted that the coil E is of greater diameter than the magazine G and surrounds the same, leaving the latter free to be either placed in or removed from the body C. The lower end of the coil is extended in a short pipe E', that connects it with the return water-pipe R. The upper end of the coil has an extension E'', that connects it with the riser or hot-water pipe and to which the jacket 9 is joined by the pipe 11. The water which flows toward the heater in the return-pipe R divides at a point near the same, a part thereof entering the bottom of jacket 9, while the remainder passes to the lower end of the internal coil E. Upon entering these two channels or courses the water quickly takes on a high temperature and rises and passes into the pipe X through the connections 11 and E'', respectively, the two streams joining therein. The coil is subjected to the greatest heat of the fire, and the water will circulate therein more rapidly than in the larger course 9. The naturally more sluggish flow in the latter is aided by the aspirating action of the stream from the coil as it passes the mouth of jacket connection 11—that is, the rapid flow of water in the coil of small capacity will tend to promote and hasten circulation in the external jacket or water-course. The circulation in the jacket 9 if it were used alone would be insufficient; but by coupling the external course with a smaller internal course I insure rapid circulation and take advantage of the entire heating-surface available within a heater of the type discussed.

Most car-heaters are so constructed that much heat is radiated from their external walls, and the car-seats near them are made uncomfortable for passengers. I overcome this objection to car-heaters by the use of the external jacket, in which the water serves to so far reduce the external temperature that the radiation from those walls is hardly appreciable. The use and operation of the heater will be understood from the foregoing.

I do not confine the invention to the specific constructions herein shown and described, as numerous modifications thereof will readily suggest themselves to one skilled in the art.

I do not herein specifically claim the form of magazine-heater that is shown in Fig. 5 and described in connection therewith, a heater embodying such improvements being reserved for a divisional application.

Having thus described my invention, I claim as new and desire to secure by Letters Patent—

1. In a hot-water heater, for railway-cars, a suitable body provided with a water-jacket, in combination with a base and a grate for said body, a dome, a fuel-magazine, the narrow cross-plate resting upon the top of said body and supporting said magazine, and a fuel-head erected on said plate and communicating with a door in said dome, spaces being left at the edges of said plate, substantially as described.

2. In a hot-water heater, for railway-cars, a suitable body, base, grate and dome, in combination with a cross-plate arranged in the upper part of said body, a magazine depending therefrom, a fuel-head erected on said cross-plate and opening through said dome, and suitable dampers arranged on opposite sides of said head, for closing the top of the body, substantially as described.

3. In a hot-water heater, for railway-cars, a suitable body, base and grate, in combination with a dome for said body, a cross-plate provided with a fuel-head in said dome, said plate resting upon but not secured to said body, a door in the dome communicating with said head, and a fuel-magazine depending from said head, substantially as described.

4. In a railway-car heater, a suitable body, base and grate, in combination with a dome for said body, a fuel-head arranged in said dome, a magazine depending from said head and integral therewith, and dampers which, with said head, substantially close the upper part of said body, substantially as described.

5. In a railway-car heater, a suitable body containing a fuel-chamber and having a dome, in combination with segmental dampers in the upper part of said body beneath said dome, a fuel-head arranged between said dampers and opening through said dome, and a magazine depending from said head, substantially as described.

6. In a railway-car heater, a suitable body containing a fuel-chamber, in combination with a dome for said body, a fuel-head opening through said dome, a fuel-magazine depending from said head, and a substantially vertical intermediate door or valve in said head, substantially as described.

7. In a railway-car heater, a suitable body containing a fuel-chamber, in combination with a cross-plate of less width than the diameter of said body, leaving segmental openings at its sides, segmental dampers for closing said openings, said dampers being arranged upon said cross-plate, and a dome inclosing said dampers, substantially as described.

8. In a railway-car heater, a suitable body containing a fuel-chamber, in combination with a cross-plate, a magazine and a fuel-head carried by said cross-plate, said head being provided with gas-outlet openings, a substantially vertical valve or door intermediately arranged in said head, the external door of said head, a suitable dome, and draft-regulating means, substantially as described.

9. In a railway-car heater, a suitable body, in combination with a dome therefor, a magazine, a fuel-head arranged in said dome and body, and draft-regulating dampers arranged at the top of said body within the dome, substantially as described.

10. In a railway-car heater, a suitable body, in combination with a dome therefor, a magazine, a fuel-head arranged in said dome and body, and draft-regulating dampers arranged within the dome and below said head, substantially as described.

11. In a railway-car heater, a substantially cylindrical body containing a fuel-chamber, in combination with a cross-plate extending across the top of said body, a magazine depending from said cross-plate, a fuel-head arranged on said cross-plate, segmental dampers pivoted on said cross-plate, and a suitable dome inclosing the top of said body, substantially as described.

12. In a railway-car heater, a substantially annular body provided with notches in its upper edge, a cross-plate held in said notches, a magazine depending from said cross-plate, a fuel-head upon the cross-plate, an intermediate door or valve pivoted on said cross-plate, within said head, an external door for said head, a suitable dome, and draft-regulating means arranged within said dome, substantially as described.

13. In a railway-car heater, a suitable body, in combination with a dome therefor, segmental dampers arranged within the dome and upon the body, provided with external handles, and a yoke 24 for securing said handles in different positions, substantially as described.

14. In a railway-car heater, a suitable body containing a fire-chamber and open in its upper end, in combination with a dome arranged upon said upper end, the integral cross-plate 16, magazine and fuel-head arranged in the upper part of said body, said head opening through said dome, substantially as described.

15. In a railway-car heater, a suitable body, a magazine arranged therein, a horizontal fuel-head connected with said magazine, and a substantially vertical intermediate valve arranged in said head, and, when closed, sealing the upper end of said magazine, and said head being provided with perforations, substantially as described.

16. In a hot-water heater, for railway-cars, an annular body having a water-jacket in its walls and provided with an offset water-exit in its upper end, return and hot-water pipes communicating with the bottom of said jacket and with said exit respectively, and a suitable base, grate and dome for said body, substantially as described.

17. In a hot-water heater, for railway-cars, an annular body containing a fuel-chamber, in combination with a suitable base, grate and dome for said body, a water-jacket surrounding said body, water-pipes communicating therewith, a water-coil arranged within the body and communicating with said water-pipes, a cross-plate upon the top of said body, a magazine depending therefrom and surrounded by said coil, a fuel-head upon said cross-plate, opening through said dome, an external door for said head, an internal door in said head, and dampers extending between said cross-plate and the sides of said body, substantially as described.

18. In a hot-water heater, for railway-cars, the combination, with the heater-body, of the magazine arranged in the upper part thereof, a fuel-head communicating with the exterior of said body and provided with an external door, and an upright closure arranged within said head, completing a gas space or dome over said magazine, substantially as described.

19. In a hot-water heater for railway-cars, the combination, with the body and the dome thereof, of the door in said dome, the magazine in said body, a fuel-head for said magazine, joining said dome, and a substantially vertical intermediate door in said head, and said intermediate door, when lowered and open, forming the floor for said head and preventing the closing of the door in the dome, substantially as described.

20. In a hot-water heater for railway-cars, a cast-metal heater-body containing a water-jacket in its walls, said body having a hollow offset 14 at its upper edge communicating with the upper part of said jacket, and pipes connected with the lower part of said jacket and with said offset respectively, substantially as described.

21. In a hot-water heater for railway-cars, a suitable body, in combination with a dome resting thereon and provided with a door, a cross-plate also resting on said body, a head upon said cross-plate connecting with the door opening in said dome, said head and plate being perforated; a magazine depending from said plate and communicating with said head; and movable draft-regulating means provided on said plate, substantially as described.

22. In a hot-water heater for railway-cars, a double-walled water-heater body, containing a water-space and closed at top and bottom, the upper forward wall of said body being thickened to strengthen the same and to provide the water-space with an inclined top, said body also having inlet and outlet openings; a dome and fuel-feeding means upon and within said body and the door of said dome being above the thickened portion of said body, substantially as described.

23. In a hot-water heater for railway-cars, a suitable body, in combination with a dome on said body, provided with a movable door; a fuel-head arranged within said dome and supported on said body; a magazine depending from said fuel-head, the top of said head being provided with perforations and a movable intermediate closure arranged in said head, and adapted when opened to prevent the closing of said dome-door, substantially as described.

In testimony whereof I have hereunto set my hand, this 21st day of December, A. D. 1903, in the presence of two witnesses.

K. D. HEQUEMBOURG

Witnesses:
C. G. HAWLEY,
WM. H. CLARKE.